(12) United States Patent
Yamanaka et al.

(10) Patent No.: US 12,645,064 B2
(45) Date of Patent: Jun. 2, 2026

(54) EYEPIECE OPTICAL SYSTEM AND DISPLAY DEVICE

(71) Applicant: Panasonic Intellectual Property Management Co., Ltd., Osaka (JP)

(72) Inventors: Takao Yamanaka, Osaka (JP); Yoshio Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 342 days.

(21) Appl. No.: 18/235,450

(22) Filed: Aug. 18, 2023

(65) Prior Publication Data

US 2023/0393384 A1 Dec. 7, 2023

Related U.S. Application Data

(63) Continuation of application No. PCT/JP2021/030418, filed on Aug. 19, 2021.

(30) Foreign Application Priority Data

Feb. 26, 2021 (JP) ................................. 2021-029929

(51) Int. Cl.
*G02B 25/00* (2006.01)
*G02B 17/08* (2006.01)

(52) U.S. Cl.
CPC ....... *G02B 25/001* (2013.01); *G02B 17/0856* (2013.01)

(58) Field of Classification Search
CPC G02B 25/001; G02B 17/0856; G02B 27/286; G02B 2027/0123; G02B 7/04;
(Continued)

(56) References Cited

U.S. PATENT DOCUMENTS

| | | |
|---|---|---|
| 2002/0024743 A1 | 2/2002 | Endo et al. |
| 2017/0068102 A1 | 3/2017 | Wong et al. |

(Continued)

FOREIGN PATENT DOCUMENTS

| | | |
|---|---|---|
| CN | 212111989 | 12/2020 |
| JP | 2001-356295 | 12/2001 |

(Continued)

OTHER PUBLICATIONS

English language translation of International Preliminary Report on Patentability issued Aug. 29, 2023 in corresponding International (PCT) Patent Application No. PCT/JP2021/030418.
(Continued)

*Primary Examiner* — William R Alexander
*Assistant Examiner* — Mackenzi Bourquine
(74) *Attorney, Agent, or Firm* — Wenderoth, Lind & Ponack, L.L.P.

(57) ABSTRACT

An eyepiece optical system has an optical axis for guiding a light beam between a pupil of a user and a display surface, and includes: a first lens element having, on a display side, a polarizing reflective surface reflecting or transmitting an incident light beam according to polarization of the incident light beam; and a second lens element disposed between the first lens element and the display surface, and having a partial reflection surface reflecting a part of the incident light beam and transmitting a remaining part thereof. The first lens element has, on a pupil side, an aspherical surface including a convex region having a convex shape opposite to the polarizing reflective surface with the optical axis being positioned therein. The aspherical surface satisfies 0.05<SagH/BF<0.25 with a sag amount SagH at a maximum image height of the display surface and a back focus BF of the eyepiece optical system.

14 Claims, 17 Drawing Sheets

(58) Field of Classification Search

CPC ...... G02B 27/0172; G02B 25/00; G02B 7/09; G02B 7/10; G02B 17/0896

See application file for complete search history.

(56) References Cited

U.S. PATENT DOCUMENTS

| | | | |
|---|---|---|---|
| 2017/0068105 A1* | 3/2017 | Yun | G02B 17/0856 |
| 2017/0357100 A1* | 12/2017 | Ouderkirk | G02B 19/0028 |
| 2018/0164590 A1 | 6/2018 | Li et al. | |
| 2019/0079234 A1 | 3/2019 | Takagi et al. | |
| 2019/0146198 A1 | 5/2019 | Khan et al. | |
| 2020/0081234 A1 | 3/2020 | Etter et al. | |
| 2020/0192079 A1 | 6/2020 | Tohara et al. | |
| 2021/0325634 A1 | 10/2021 | Katsuda et al. | |
| 2023/0168501 A1* | 6/2023 | Yang | G02B 27/28 |
| | | | 359/633 |

FOREIGN PATENT DOCUMENTS

| | | |
|---|---|---|
| JP | 6340085 | 6/2018 |
| JP | 2019-53152 | 4/2019 |
| WO | 2017/039711 | 3/2017 |
| WO | 2018/211405 | 11/2018 |
| WO | 2020/045517 | 3/2020 |

OTHER PUBLICATIONS

International Search Report issued Nov. 2, 2021 in International (PCT) Application No. PCT/JP2021/030418.

Extended European Search Report issued Jul. 12, 2024 in European Patent Application No. 21927984.1.

Timothy L. Wong, et al., "Folded optics with birefringent reflective polarizers", Proc. of SPIE, Jun. 26, 2017, 10335, p. 103350E-1-103350E-7.

\* cited by examiner

Fig. 6

| SURFACE DATA (EXAMPLE 1) | | | | |
|---|---|---|---|---|
| surface num. | r | d | nd | vd |
| 0 | ∞ | variable | | |
| 1(diaphragm) | ∞ | 14.000 | | |
| 2* | 500.000 | 2.500 | 1.636 | 23.9 |
| 3 | ∞ | 0.500 | | |
| 4* | 81.268 | 8.912 | 1.516 | 55.8 |
| 5* | −59.206 | −8.912 | 1.516 | 55.8 |
| 6* | 81.268 | −0.500 | | |
| 7 | ∞ | 0.500 | | |
| 8* | 81.268 | 8.912 | 1.516 | 55.8 |
| 9* | −59.206 | 1.036 | | |
| 10 | ∞ | 1.200 | | |
| 11 | ∞ | 0.900 | 1.517 | 64.2 |
| display surf. | ∞ | | | |

Fig. 7

| ASPHERICAL DATA (EXAMPLE 1) | | | | | |
|---|---|---|---|---|---|
| Surf. num. | K | A4 | A6 | A8 | A10 |
| 2nd surf. | 0.00000E+00 | 2.71534E-05 | -2.89061E-07 | 1.05587E-09 | -1.74417E-12 |
| 4th surf. | 0.00000E+00 | -2.10526E-05 | 3.93478E-08 | -2.76645E-11 | 0.00000E+00 |
| 5th surf. | 0.00000E+00 | -4.15783E-07 | -8.41974E-09 | 1.11038E-11 | 0.00000E+00 |
| 6th surf. | 0.00000E+00 | -2.10526E-05 | 3.93478E-08 | -2.76645E-11 | 0.00000E+00 |
| 8th surf. | 0.00000E+00 | -2.10526E-05 | 3.93478E-08 | -2.76645E-11 | 0.00000E+00 |
| 9th surf. | 0.00000E+00 | -4.15783E-07 | -8.41974E-09 | 1.11038E-11 | 0.00000E+00 |

Fig. 8

| VARIOUS DATA (EXAMPLE1) | |
|---|---|
| focal length | 15.268 |
| pupil diameter | 4.000 |
| half angle of view | 47.570 |
| image height | 11.500 |
| optical overall length | 29.048 |
| BF (in air) | 2.829 |

Fig. 10

| | EXAMPLE 1 | EXAMPLE 2 | EXAMPLE 3 | EXAMPLE 4 |
|---|---|---|---|---|
| VIEWING ANGLE | 95° | 96° | 95° | 98° |
| EYE RELIEF | 14mm | 14mm | 14mm | 12mm |
| (1) SagH／BF | 0.068 | 0.114 | 0.179 | 0.054 |
| (2) fl／r1 | 0.031 | 0.111 | 0.157 | 0.029 |

Fig. 12

| SURFACE DATA (EXAMPLE 2) | | | | |
|---|---|---|---|---|
| surface num. | r | d | nd | vd |
| 0 | ∞ | variable | | |
| 1(diaphragm) | ∞ | 14.000 | | |
| 2* | 145.495 | 2.844 | 1.544 | 55.6 |
| 3* | −174.576 | 0.500 | | |
| 4 | ∞ | 8.654 | 1.516 | 55.8 |
| 5* | −48.419 | −8.654 | 1.516 | 55.8 |
| 6 | ∞ | −0.500 | | |
| 7* | −174.576 | 0.500 | | |
| 8 | ∞ | 8.654 | 1.516 | 55.8 |
| 9* | −48.419 | 1.069 | | |
| 10 | ∞ | 1.000 | | |
| 11 | ∞ | 0.900 | 1.517 | 64.2 |
| display surf. | ∞ | | | |

Fig. 13

| ASPHERICAL DATA (EXAMPLE 2) | | | | | |
|---|---|---|---|---|---|
| Surf. num. | K | A4 | A6 | A8 | A10 |
| 2nd surf. | 0.00000E+00 | 4.29832E-06 | -1.83333E-07 | 8.53235E-10 | -1.60624E-12 |
| 3rd surf. | 0.00000E+00 | -2.77156E-06 | 2.34851E-08 | -2.44077E-11 | 0.00000E+00 |
| 5th surf. | 0.00000E+00 | 4.20719E-07 | -2.94630E-09 | 5.27496E-12 | 0.00000E+00 |
| 7th surf. | 0.00000E+00 | -2.77156E-06 | 2.34851E-08 | -2.44077E-11 | 0.00000E+00 |
| 9th surf. | 0.00000E+00 | 4.20719E-07 | -2.94630E-09 | 5.27496E-12 | 0.00000E+00 |

Fig. 14

| VARIOUS DATA (EXAMPLE2) | |
|---|---|
| focal length | 16.145 |
| pupil diameter | 4.000 |
| half angle of view | 47.771 |
| image height | 11.500 |
| optical overall length | 28.967 |
| BF (in air) | 2.662 |

Fig. 17

| SURFACE DATA (EXAMPLE 3) | | | | |
|---|---|---|---|---|
| surface num. | r | d | nd | vd |
| 0 | ∞ | variable | | |
| 1(diaphragm) | ∞ | 14.000 | | |
| 2* | 100.006 | 2.000 | 1.516 | 55.8 |
| 3 | ∞ | 0.790 | | |
| 4* | 43.515 | 8.486 | 1.516 | 55.8 |
| 5* | -84.889 | -8.486 | 1.516 | 55.8 |
| 6* | 43.515 | -0.790 | | |
| 7 | ∞ | 0.790 | | |
| 8* | 43.515 | 8.486 | 1.516 | 55.8 |
| 9* | -84.889 | 1.078 | | |
| 10 | ∞ | 1.200 | | |
| 11 | ∞ | 0.900 | 1.517 | 64.2 |
| display surf. | ∞ | | | |

Fig. 18

| ASPHERICAL DATA (EXAMPLE 3) | | | | | |
|---|---|---|---|---|---|
| Surf. num. | K | A4 | A6 | A8 | A10 |
| 2nd surf. | 0.00000E+00 | 5.64493E-06 | -1.45886E-07 | 4.06479E-10 | -9.01456E-13 |
| 4th surf. | 0.00000E+00 | -5.28681E-05 | 9.03377E-08 | -8.09298E-11 | 0.00000E+00 |
| 5th surf. | 0.00000E+00 | -1.04349E-05 | 7.65238E-09 | -1.17173E-11 | 0.00000E+00 |
| 6th surf. | 0.00000E+00 | -5.28681E-05 | 9.03377E-08 | -8.09298E-11 | 0.00000E+00 |
| 8th surf. | 0.00000E+00 | -5.28681E-05 | 9.03377E-08 | -8.09298E-11 | 0.00000E+00 |
| 9th surf. | 0.00000E+00 | -1.04349E-05 | 7.65238E-09 | -1.17173E-11 | 0.00000E+00 |

Fig. 19

| VARIOUS DATA (EXAMPLE3) | |
|---|---|
| focal length | 15.721 |
| pupil diameter | 4.000 |
| half angle of view | 47.331 |
| image height | 11.500 |
| optical overall length | 28.453 |
| BF (in air) | 2.871 |

Fig. 22

| SURFACE DATA (EXAMPLE 4) | | | | |
|---|---|---|---|---|
| surface num. | r | d | nd | vd |
| 0 | ∞ | variable | | |
| 1(diaphragm) | ∞ | 12.000 | | |
| 2* | 500.000 | 2.502 | 1.636 | 23.9 |
| 3 | ∞ | 0.500 | | |
| 4* | 65.715 | 8.408 | 1.516 | 55.8 |
| 5* | −59.064 | −8.408 | 1.516 | 55.8 |
| 6* | 65.715 | −0.500 | | |
| 7 | ∞ | 0.500 | | |
| 8* | 65.715 | 8.408 | 1.516 | 55.8 |
| 9* | −59.064 | 1.000 | | |
| 10 | ∞ | 1.200 | | |
| 11 | ∞ | 0.900 | 1.517 | 64.2 |
| display surf. | ∞ | | | |

Fig. 23

| ASPHERICAL DATA　(EXAMPLE 4) | | | | | |
|---|---|---|---|---|---|
| Surf. num. | K | A4 | A6 | A8 | A10 |
| 2nd surf. | 0.00000E+00 | 1.61444E-05 | -1.93504E-07 | 8.10420E-10 | -1.60561E-12 |
| 4th surf. | 0.00000E+00 | -2.77528E-05 | 4.98562E-08 | -3.53205E-11 | 0.00000E+00 |
| 5th surf. | 0.00000E+00 | -2.50626E-06 | -3.62775E-09 | 7.00160E-12 | 0.00000E+00 |
| 6th surf. | 0.00000E+00 | -2.77528E-05 | 4.98562E-08 | -3.53205E-11 | 0.00000E+00 |
| 8th surf. | 0.00000E+00 | -2.77528E-05 | 4.98562E-08 | -3.53205E-11 | 0.00000E+00 |
| 9th surf. | 0.00000E+00 | -2.50626E-06 | -3.62775E-09 | 7.00160E-12 | 0.00000E+00 |

Fig. 24

| VARIOUS DATA　(EXAMPLE4) | |
|---|---|
| focal length | 14.551 |
| pupil diameter | 4.000 |
| half angle of view | 49.224 |
| image height | 11.500 |
| optical overall length | 26.510 |
| BF (in air) | 2.793 |

EYEPIECE OPTICAL SYSTEM AND DISPLAY DEVICE

TECHNICAL FIELD

The present disclosure relates to an eyepiece optical system and a display device including the eyepiece optical system.

BACKGROUND ART

JP 2001-356295 A discloses an eyepiece optical system that virtually displays, in an eye of an observer, an image displayed on a two-dimensional display element in a viewfinder of a head mounted display or various cameras. The eyepiece optical system includes, in order from an observer side, an aspherical resin lens including a first surface that is an aspherical surface and a second surface that selectively reflects or transmits circularly polarized light, a spherical glass lens having a semi-transmissive mirror surface formed on the first surface, and a polarization conversion element that converts image light from the two-dimensional display element into circularly polarized light. On the first surface of the aspherical resin lens, at least a range in which a light ray passes through is provided in a convex shape on the observer side. Patent Document 1 enables high-grade virtual image display in an eyepiece optical system having a short overall length and a thin type.

SUMMARY

The present disclosure provides an eyepiece optical system and a display device capable of facilitating to ensure a visual field of a user.

An eyepiece optical system in the present disclosure has an optical axis for guiding a light beam between a pupil of a user and a display surface, and includes a first lens element and a second lens element. The first lens element has a polarizing reflective surface on a display side, the polarizing reflective surface reflecting or transmitting an incident light beam according to polarization of the incident light beam, the display side being toward the display surface. The second lens element is disposed between the first lens element and the display surface, and has a partial reflection surface reflecting a part of the incident light beam and transmitting a remaining part of the incident light beam. The first lens element has an aspherical surface including a convex region on a pupil side, the convex region having a convex shape toward a side opposite to the polarizing reflective surface with the optical axis being positioned therein, the pupil side being toward the pupil. The aspherical surface on the pupil side in the first lens element satisfies a following condition (1):

$$0.05 < SagH/BF < 0.25 \qquad (1)$$

where

SagH: a sag amount at a maximum image height of the display surface, and

BF: a back focus of the eyepiece optical system.

A display device in the present disclosure includes: a display element having the display surface to display an image; and the eyepiece optical system described above.

According to the eyepiece optical system and the display device in the present disclosure, the visual field of the user can be facilitated to ensure.

BRIEF DESCRIPTION OF THE DRAWINGS

FIG. 6 is a chart showing surface data on a visual optical system in Numerical Example 1.

FIG. 7 is a chart showing aspherical data on the visual optical system in Numerical Example 1.

FIG. 8 is a chart showing various data on the visual optical system in Numerical Example 1.

FIG. 10 is a chart showing satisfiability of various conditions in the visual optical system according to the first embodiment.

FIG. 12 is a chart showing surface data on a visual optical system in Numerical Example 2.

FIG. 13 is a chart showing aspherical data on the visual optical system in Numerical Example 2.

FIG. 14 is a chart showing various data on the visual optical system in Numerical Example 2.

FIG. 17 is a chart showing surface data on a visual optical system in Numerical Example 3.

FIG. 18 is a chart showing aspherical data on the visual optical system in Numerical Example 3.

FIG. 19 is a chart showing various data on the visual optical system in Numerical Example 3.

FIG. 22 is a chart showing surface data on a visual optical system in Numerical Example 4.

FIG. 23 is a chart showing aspherical data on the visual optical system in Numerical Example 4.

FIG. 24 is a chart showing various data on the visual optical system in Numerical Example 4.

DETAILED DESCRIPTION

Hereinafter, embodiments will be described in detail with reference to the drawings as appropriate. However, a detailed description more than necessary may be omitted. For example, a detailed description of already well-known matters or a redundant description of substantially the same configuration may be omitted. This is to avoid the following description from becoming unnecessarily redundant and to facilitate understanding by those skilled in the art.

It should be noted that the applicant provides the accompanying drawings and the following description for a person skilled in the art to fully understand the present disclosure. Thus, the drawings and the description are not intended to limit the subject matter defined in the claims.

First Embodiment

Hereinafter, a visual optical system being an example of an eyepiece optical system according to the present disclosure and a first embodiment of a display device using the visual optical system will be described.

1. Display Device

A display device according to a first embodiment will be described with reference to FIGS. 1 and 2.

Figure 1:
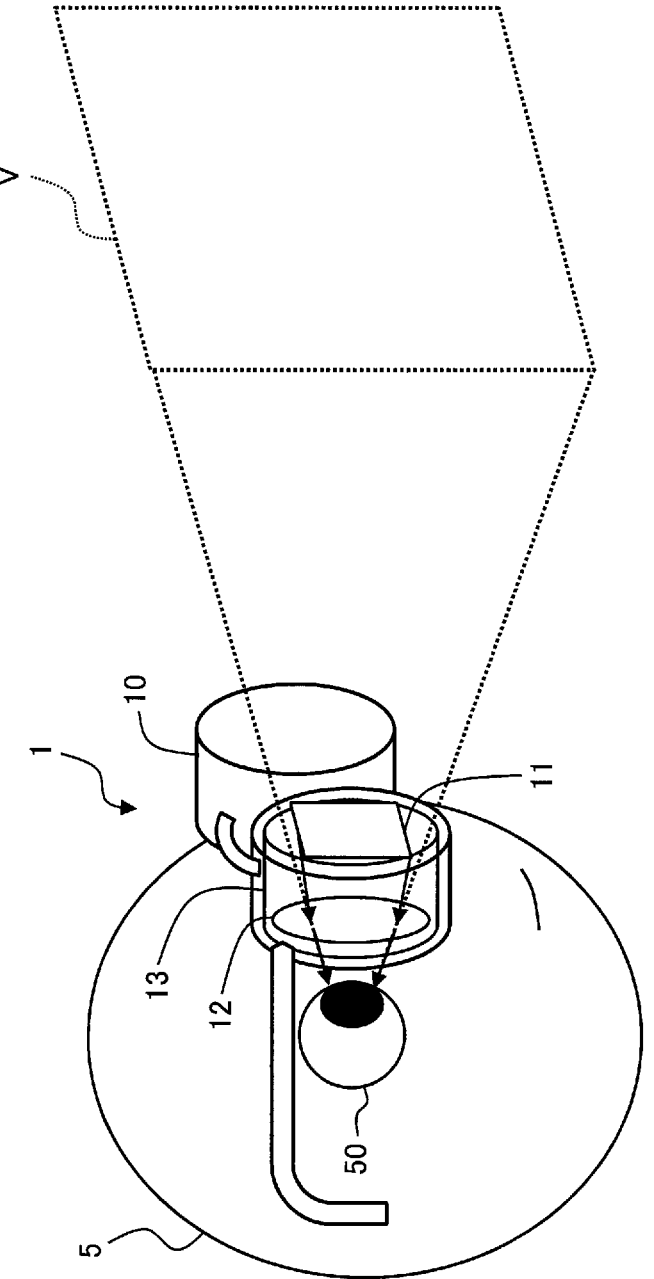
FIG. 1 is a diagram showing a configuration of a display device according to a first embodiment of the present disclosure.

FIG. 1 is a diagram showing a configuration of a display device 1 according to the first embodiment of the present disclosure. The display device 1 according to the present embodiment is a head-mounted display (HMD) that is worn on a head portion of the user 5 to allow the user 5 to view a virtual image V. The display device 1 is configured as, for example, a spectacle type in which two projection units 10 are provided as portions corresponding to both eyes of the user 5.

For example, as shown in FIG. 1, the display device 1 includes a display element 11, a visual optical system 12, and a diopter adjustment mechanism 13 for each projection unit 10. Each projection unit 10 of the display device 1 projects display light beams being light beams for causing the user 5 to view the virtual image V, from the display element 11 onto the eye 50 of the user 5 through the visual optical system 12. Such a display device 1 is useful to have a wide viewing angle corresponding to a range for causing the user 5 to view the virtual image V, and to have a small size and a light weight.

The visual optical system 12 according to the present embodiment includes a polarizing reflection optical system that turns back an optical path using reflection according to polarization of light. Accordingly, the visual optical system 12 can be a thin type with a short optical overall length, and the display device 1 can be easily reduced in size. The visual optical system 12 of the present embodiment has a thin configuration and a configuration that facilitates to obtain a wide viewing angle in the display device 1. Details of the visual optical system 12 will be described below.

The diopter adjustment mechanism 13 is an example of a movable mechanism for adjusting the diopter according to the visual acuity of each eye 50 in the display device 1. According to the diopter adjustment mechanism 13, for example, the user 5 can adjust the virtual image V so as to be easily recognized visually in accordance with the visual acuity of his/her own in the display device 1. FIG. 2 illustrates the diopter adjustment mechanism 13.

Figure 2:
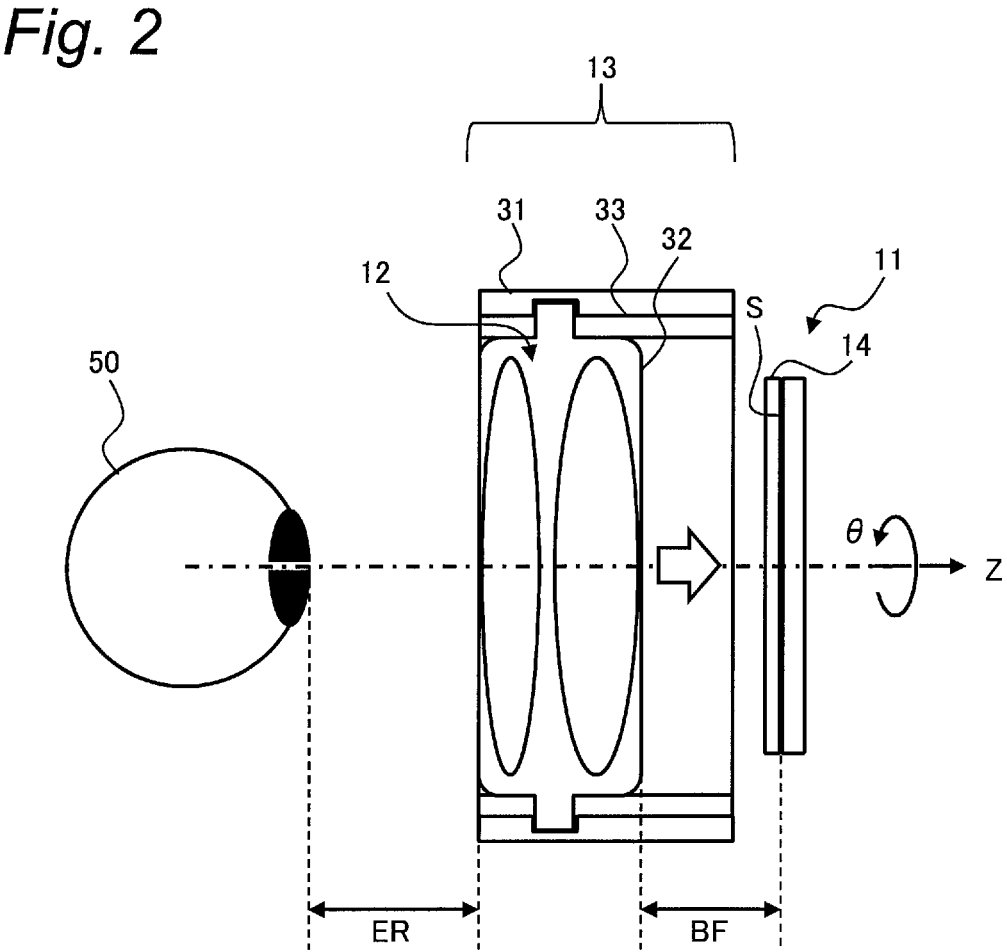
FIG. 2 is a diagram illustrating a diopter adjustment mechanism in the display device.

Hereinafter, as shown in FIG. 2, a direction along the optical axis of the visual optical system 12 is defined as a Z direction, a direction rotating around the optical axis is defined as a θ direction, a pupil side where the pupil of the eye 50 is assumed to be positioned with respect to the visual optical system 12 is defined as a −Z side, and a display side where the display element 11 is positioned is defined as a +Z side.

The display element 11 includes a display surface S that displays various images. For example, the display surface S includes a plurality of pixels, and emits a display light beam indicating an image for causing the user to view the virtual image V. The display element 11 is configured by providing the organic EL display with a circular polarizer 14, for example. The display light beam from the display element 11 is emitted to the −Z side in circularly polarized light set clockwise or counterclockwise in the circular polarizer 14, for example.

The display element 11 is not limited to the above configuration, and may be a liquid crystal display device, a reflective liquid crystal device (LCOS), a digital mirror device (DMD), a micro LED display, or various micro displays, for example. In addition, the display element 11 does not need to particularly include the circular polarizer 14. The circular polarizer 14 may be included in the visual optical system 12.

As shown in FIG. 2, the visual optical system 12 has an eye relief ER on the −Z side and a back focus BF on the +Z side along the optical axis, the eye relief ER being a distance to the eye 50, and the back focus BF being a distance to the display surface S of the display element 11.

In the present embodiment, the diopter adjustment mechanism 13 implements adjustment of diopter with a simple configuration in which the visual optical system 12 is moved in the Z direction as one lens group. For example, the diopter adjustment mechanism 13 adjusts the diopter so that the more the visual optical system 12 is moved to the +Z side, the more the visual acuity of strong nearsightedness is corrected. The movable range in such diopter adjustment depends on the length of the back focus BF of the visual optical system 12. Thus, the present embodiment provides the visual optical system 12 being a thin type and having a wide viewing angle with ensuring the back focus BF so that the diopter adjustment can be performed.

The diopter adjustment mechanism 13 may be configured not to allow the visual optical system 12 to rotate in the θ direction when the visual optical system 12 moves in the Z direction, and includes, e.g., a cam mechanism. For example, as shown in FIG. 2, the diopter adjustment mechanism 13 includes a cam cylinder 31, a lens holding portion 32, and a rotation regulating portion 33.

For example, the cam cylinder 31 is a cylindrical member having a helical cam groove, and is configured to be rotatable in the θ direction. The diopter adjustment mechanism 13 may include a member that can be operated by the user 5, and may include, for example, a dial, a ring, or the like that rotates the cam cylinder 31.

The lens holding portion 32 is a member that holds the visual optical system 12 inside. In the lens holding portion 32, relative positions between various lenses in the visual optical system 12 are fixed. The lens holding portion 32 is provided with a pin or the like that engages with the cam groove of the cam cylinder 31.

The rotation regulating portion 33 fixes the angular position of the lens holding portion 32 in the θ direction with allowing the movement of the lens holding portion 32 in the Z direction. The rotation regulating portion 33 is configured by providing, between the cam cylinder 31 and the lens holding portion 32, a cylindrical member provided so that a hole which the pin of the lens holding portion 32 penetrates extends in the Z direction, for example.

According to the diopter adjustment mechanism 13 as described above, the lens holding portion 32 moves in the Z direction according to the rotation of the cam cylinder 31, with the rotation of the lens holding portion 32 being restricted. Accordingly, it is possible to suppress such a decrease in image quality due to a shift in the angular position of the visual optical system 12, as is concerned when the display light beam from the display element 11 has a shift from the circularly polarized light, for example.

In particular, if it is unnecessary to suppress the decrease in image quality as described above, the diopter adjustment mechanism 13 does not need to restrict the rotation of the visual optical system 12, and may include, e.g., a screw fastening method. The visual optical system 12 and the diopter adjustment mechanism 13 may be an integrally provided module. The eyepiece optical system of the present embodiment may include a diopter adjustment mechanism 13 in addition to the visual optical system 12.

2. Visual Optical System

Details of the visual optical system 12 in the present embodiment will be described below.

2-1. Configuration

The configuration of the visual optical system 12 in the present embodiment will be described with reference to FIG. 3. In the following description, an example of the visual optical system 12 will be used.

Figure 3:
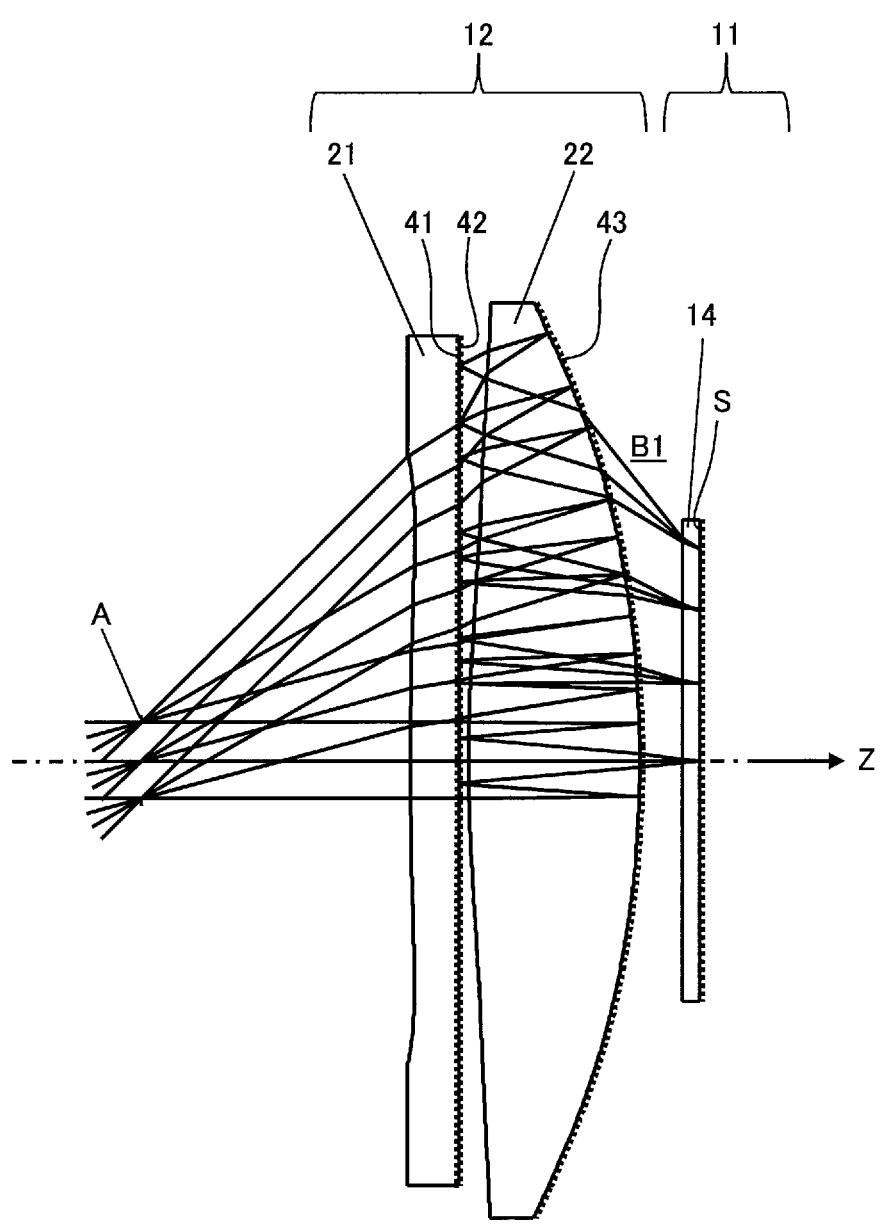
FIG. 3 is a lens arrangement diagram showing a configuration of a visual optical system according to Example 1.

FIG. 3 is a lens arrangement diagram showing a configuration of the visual optical system 12 according to Example 1 of the present embodiment. In FIG. 3, a virtual diaphragm A corresponding to the pupil of the user 5 of the display device 1 is illustrated on the –Z side of the visual optical system 12 (hereinafter also referred to as "pupil A"). FIG. 3 illustrates a light ray in which the display light beam B1 from each part of the display surface S in the display element 11 reaches the pupil A through the parallel flat-shaped circular polarizer 14 and the visual optical system 12.

The visual optical system 12 in the present embodiment includes a first lens element 21 and a second lens element 22 that are arranged in order from the pupil side (–Z side) to the display side (+Z side) along the Z direction of the optical axis. The first lens element 21 and the second lens element 22 constitute one lens group movable in the Z direction with the relative positions being fixed to each other, for example.

For example, the visual optical system 12 includes such one lens group, and is movable using the diopter adjustment mechanism 13 (FIG. 2) described above. FIG. 3 illustrates an arrangement of the visual optical system 12 in a state of zero diopter to which diopter adjustment is not applied. The position of the visual optical system 12 in the zero diopter state is on the most –Z side within the movable range of the diopter adjustment mechanism 13.

In the visual optical system 12, the first lens element 21 is a reflective polarized lens including a polarizing reflector 41. For example, the first lens element 21 is made of a lens material such as resin or glass. According to the resin lens material, it is easy to reduce the weight of the visual optical system 12, for example. For example, the surface on the –Z side of the first lens element 21 is positioned closest to the pupil in the visual optical system 12, to face the eye 50 of the user 5 (see FIG. 2).

In the present embodiment, the polarizing reflector 41 is provided on the +Z-side surface of the first lens element 21. For example, the polarizing reflector 41 is formed by bonding a reflective polarizing film. According to this, it is possible to avoid a situation in which the stuck film is exposed to the pupil side and the film is easily peeled off by sticking the first lens element 21 to the +Z side surface. The polarizing reflector 41 reflects light of one polarization component (e.g., p-polarized light) of polarization components orthogonal to each other with respect to linearly polarized light, and transmits light of the other polarization component (e.g., s-polarized light), for example. The +Z-side surface of the first lens element 21 is an example of a polarizing reflective surface in the present embodiment.

In the first lens element 21 of Example 1, a ¼ wave plate 42 is provided further on the +Z side of the polarizing reflector 41. The ¼ wave plate 42 is an example of a ¼ wavelength phase element that assigns a phase delay by ¼ wavelength in a preset polarization direction to an incident light beam. For example, the ¼ wave plate 42 is configured by sticking a ¼ wavelength film to the +Z side of the reflective polarizing film, on the +Z-side surface of the first lens element 21. The ¼ wave plate 42 and the polarizing reflector 41 are disposed by aligning the orientations related to the polarization direction with each other.

In the present embodiment, the –Z-side surface in the first lens element 21 includes a rotationally symmetric aspherical surface around the optical axis. The –Z-side surface of the first lens element 21 is formed into a convex shape near the center where the optical axis is positioned, and has a curved shape that is warped at the peripheral portion (see FIG. 5). In Example 1, the +Z-side surface of the first lens element 21 is planar. The first lens element 21 has positive power (i.e., refractive power) at least near the center, and basically functions as a positive lens.

The second lens element 22 is a beam splitter lens including a half mirror 43. For example, the second lens element 22 is made of a lens material such as resin or glass. According to the glass lens material, for example, it is possible to avoid a situation in which the image quality is deteriorated due to birefringence in the resin, and it is possible to improve the image quality of the visual optical system 12.

In the present embodiment, the half mirror 43 is provided on the +Z-side surface of the second lens element 22. For example, the half mirror 43 is configured by applying visible light reflection coating or vapor deposition in which the reflectance is set to a predetermined value to the +Z side surface of the second lens element 22. The predetermined value of the reflectance is, e.g., 50%. The +Z-side surface of the second lens element 22 is an example of a partial reflection surface that reflects a part of the incident light beam and transmits the rest.

The second lens element 22 has positive power and is a positive lens. The power of the second lens element 22 is larger than the power of the first lens element 21, for example. For example, the ±Z-side surfaces of the second lens element 22 are rotationally symmetric aspherical surfaces.

In the present example, the –Z-side surface of the second lens element 22 is convex toward the –Z side at least near the center. The +Z-side surface of the second lens element 22 is convex toward the +Z side as a whole, and the curvature increases from the central portion toward the peripheral portion, for example.

2-2. Operation

An operation in which the visual optical system 12 configured as described above functions as a reflective polarizing optical system in the display device 1 will be described with reference to FIG. 4.

Figure 4:
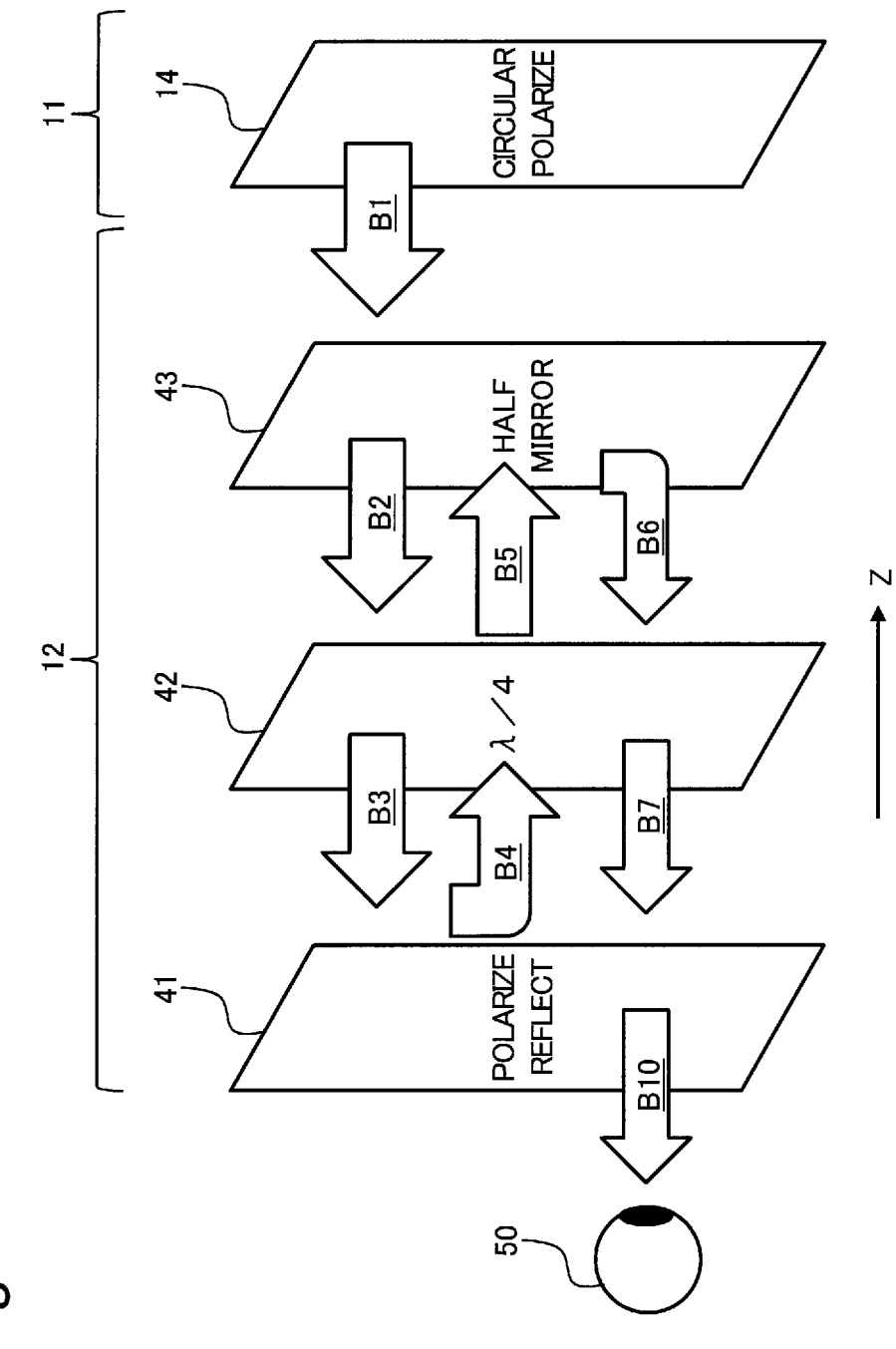
FIG. 4 is a diagram for illustrating an operation by the visual optical system of the first embodiment.

In the display device 1, first, as shown in FIG. 4, the display light beam B1 from the display element 11 enters the visual optical system 12 from the +Z-side in the circularly polarized light set in advance by the circular polarizer 14, for example.

In the visual optical system 12, the half mirror 43 on the +Z side of the second lens element 22 transmits the display light beam B2 as the amount of a predetermined transmittance such as 50% in the incident display light beam B1 and emits the display light beam B2 to the –Z side.

The display light beam B2 transmitted through the half mirror 43 is converted from circularly polarized light into p-polarized light when passing through the ¼ wave plate 42 in the first lens element 21, for example. For example, the display light beam B3 of p-polarized light is incident on the polarizing reflector 41 from the ¼ wave plate 42.

The polarizing reflector 41 reflects the display light beam B3 incident from the ¼ wave plate 42 as described above toward the +Z side based on the polarization state thereof. The display light beam B4 reflected by the polarizing reflector 41 passes through the ¼ wave plate 42 again, and is converted from p-polarized light to circularly polarized light. The display light beam B5 after the conversion travels to the +Z side and enters the half mirror 43 again.

The half mirror 43 reflects the display light beam B6 at the ratio according to a predetermined reflectance such as 50% in the display light beam B5 incident again. The display light beam B6 reflected by the half mirror 43 travels to the −Z side as with the display light beam B2 at the time of transmission in the circularly polarized light in the reverse turning direction from the circularly polarized light of the display light beam B2 previously transmitted through the half mirror 43, and is incident on the ¼ wave plate 42.

When passing through the ¼ wave plate 42, the display light beam B6 of the circularly polarized light in the reverse turning direction is converted into the display light beam B7 of the s-polarized light different from the p-polarized light at the time of the previous passage, and is incident on the polarizing reflector 41. The polarizing reflector 41 transmits the converted display light beam B7 based on the polarization state. Accordingly, the display light beam B7 after transmission is emitted from the visual optical system 12 to the −Z side. The display light beam B10 thus emitted from the visual optical system 12 can reach the eye 50 of the user 5 (FIG. 1).

As described above, by using the optical paths in which the display light beams B1 to B10 travel with folding back between the polarizing reflector 41 and the half mirror 43 in the visual optical system 12, a lens element having a long optical path length and a small lens thickness can be adopted, and the visual optical system 12 can be easily thinned.

In the present embodiment, by providing the polarizing reflector 41 on the +Z side of the first lens element 21, the range in which the optical paths of the display light beams B2 to B7 in the visual optical system 12 are folded back is limited from the +Z side surface of the first lens element 21 to the +Z side surface of the second lens element 22 (see FIG. 3). That is, the number of times the optical path of the display light beam B10 passes through the −Z side surface of the first lens element 21 is set to 1.

Accordingly, in the visual optical system 12 of the present embodiment, each light ray direction in various light rays of the display light beam B10 incident over the range of the viewing angle (see FIG. 3) is easily controlled by the surface shape of the −Z side surface of the first lens element 21, and a wide viewing angle is easily obtained. For example, when the back focus BF is long, it is conceivable that the difficulty of widening the viewing angle of the optical system increases. In contrast to this, in the visual optical system 12 of the present embodiment, by the configuration of the −Z side surface of the first lens element 21 described below, it is possible to achieve widening of the viewing angle with taking the length of the back focus BF for diopter adjustment, and the user 5 can obtain a visual field in which the virtual image V can be easily viewed at a wide viewing angle.

2-3. Various Conditions

Figure 5:
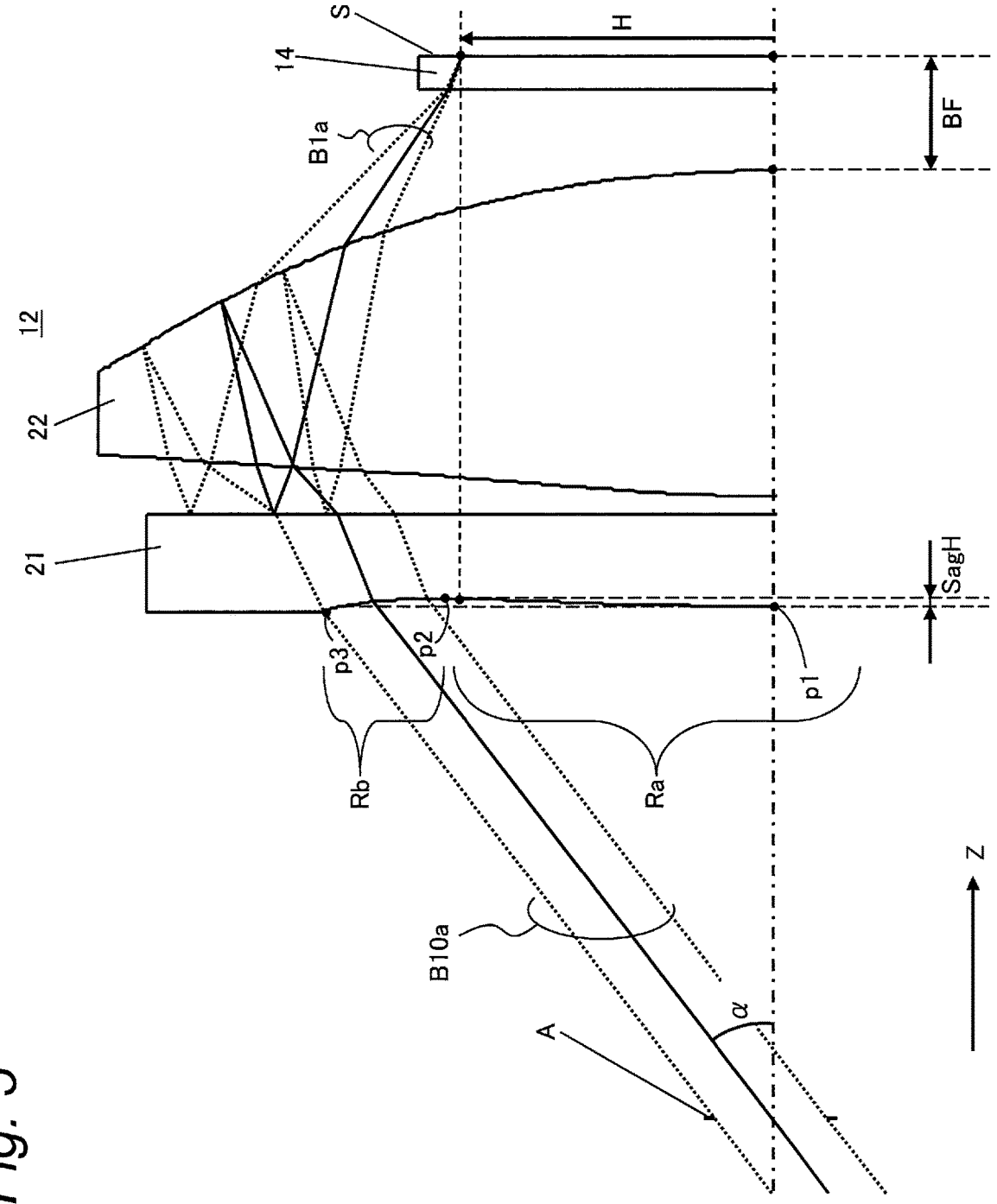
FIG. 5 is a diagram for illustrating a shape of an aspherical surface in the visual optical system.

Conditions that the visual optical system 12 of the present embodiment satisfies depending on the −Z side surface of the first lens element 21 or the like will be described with reference to FIG. 5. FIG. 5 is a diagram for illustrating a shape of an aspherical surface in the visual optical system 12.

The visual optical system 12 of the present embodiment satisfies condition (1) defined as the following expression:

$$0.05 < \text{SagH}/\text{BF} < 0.25 \tag{1}$$

where SagH is a sag amount of the −Z-side surface of the first lens element 21 at reference height H. The sag amount is defined as positive on the +Z side and negative on the −Z side. For example, a value in a zero diopter state is used as the back focus BF. The reference height H is defined as a maximum image height of the display surface S. The maximum image height H is a maximum image height in a range in which a light beam can be incident on the pupil A through the visual optical system 12 in the display light beam B1 emitted from the display surface S of the display element 11. Various parameters described above and the shape of the +Z side surface of the first lens element 21 will be described with reference to FIG. 5.

FIG. 5 illustrates an optical path in which the display light beam B1a emitted from the maximum image height H on the display surface S reaches the pupil A through the visual optical system 12. In the optical path of the present example, the display light beam B10a reaching the first lens element 21 has a light ray height equal to or higher than the maximum image height H. The display light beam B10a enters the pupil A from the −Z side surface of the first lens element 21 at the incident angle α corresponding to the end portion in the range of the viewing angle.

The −Z-side surface of the first lens element 21 includes a convex region Ra provided in a convex shape with the center position through which the optical axis passes as the vertex p1, and a curved region Rb provided around the convex region Ra. The curved region Rb has a shape curved toward the −Z side with increasing distance from the center of the first lens element 21, that is, has a warped shape.

The light ray of the display light beam B10a corresponding to the end portion of the viewing angle described above (e.g., the chief ray) reaches the pupil A through the curved region Rb on the −Z side surface of the first lens element 21. In the present embodiment, as the portion (through which the display light beam B10a passes) corresponding to the end portion of the viewing angle on the −Z side surface of the first lens element 21 is brought close to the pupil A due to the warpage of the curved region Rb, a wide viewing angle can be easily obtained with maintaining the imaging performance of the visual optical system 12.

The conditional expression (1) described above defines the ratio between the sag amount of the −Z side surface of the first lens element 21 and the back focus BF. As the visual optical system 12 according to the present embodiment satisfies the conditional expression (1), it is possible to achieve a polarizing reflection optical system that can adjust the diopter at a wide viewing angle of, for example, 90° or more even though being small and lightweight. In contrast to this, for example, the eyepiece optical system of Patent Document 1 does not satisfy the conditional expression (1), and the viewing angle is a narrow one of less than 25°.

When the upper limit of the conditional expression (1) is exceeded, the sag amount on the −Z side surface of the first lens element 21 is excessive in the peripheral portion with the length of the back focus BF being ensured. That is, the distance between the peripheral portion of the first lens element 21 and the pupil A is too long, and it is difficult to obtain a wide viewing angle. Alternatively, when the back focus BF is shortened, the movable range of the lens group for diopter adjustment is narrowed, and it is difficult for the user 5 to easily see the virtual image V when the user 5 has myopia.

On the other hand, when the lower limit of the conditional expression (1) is fallen below, the sag amount of the −Z-side surface of the first lens element 21 is too small, and it is difficult to appropriately correct the astigmatism of the off-axis light flux. That is, fine imaging performance cannot be obtained in the visual optical system 12. Alternatively, the back focus BF is too long, the overall optical length is long, and miniaturization is difficult.

The effect described above with respect to the conditional expression (1) can be more remarkably obtained when the visual optical system 12 satisfies the following conditional expression (1a).

$$0.05 < SagH/BF < 0.25 \tag{1a}$$

In the example in FIG. 5, the position of the maximum image height H as the reference of the sag amount SagH in the conditional expressions (1) and (1a) is near the boundary between the convex region Ra and the curved region Rb on the −Z side surface of the first lens element 21. For example, as shown in FIG. 5, in the cross section passing through the optical axis of the first lens element 21, the vertex p1 in the convex region Ra and the inflection point p2 and end point p3 in the curved region Rb are arranged in this order from the central portion to the peripheral portion on the −Z side surface. The position of the maximum image height H is near the inflection point p2 in the present example, but is not particularly limited thereto.

In the convex region Ra, the sag amount increases from the vertex p1 toward the peripheral portion, for example. At this time, the rate at which the sag amount increases (i.e., the gradient of the sag amount) gradually increases from the vertex p1 to a position in the middle, and gradually decreases beyond the position.

In the curved region Rb, the inflection point p2 indicates a position (i.e., a local maximum point) where the sag amount is maximum. The end point p3 indicates the outer end of the curved region Rb. In the convex region Ra, the sag amount decreases from the inflection point p2 toward the end point p3. At this time, the rate at which the sag amount decreases (absolute value of the gradient) gradually increases, for example.

According to the warpage of the curved region Rb, the −Z-side surface of the first lens element 21 has a sag amount smaller than the sag amount SagH of the maximum image height H at the position of the maximum image height H and the position on the curved region Rb farther from the optical axis than the inflection point p2. For example, in the example in FIG. 5, the sag amount of the end point p3 of the curved region Rb is smaller than the sag amount of each portion of the convex region Ra. It should be noted that in the curved region Rb, for example, a range through which the display light beam B10*a* that can enter the pupil A passes may be regarded as an effective region.

In addition, the visual optical system 12 of the present embodiment may satisfy a condition (2) represented by the following expression:

$$0.01 < fl/r1 < 0.20 \tag{2}$$

where fl is the focal length of the visual optical system 12, and r1 is the curvature radius of the −Z-side surface of the first lens element 21. The curvature radius r1 is measured, for example, at the vertex p1.

The conditional expression (2) described above defines a ratio between the focal length fl of the visual optical system 12 and the curvature radius r1 of the −Z-side surface of the first lens element 21. As the visual optical system 12 according to the present embodiment satisfies the conditional expression (2), it is possible to easily achieve a polarizing reflection optical system that can adjust the diopter at a wide viewing angle even though being small and lightweight.

When the upper limit of the conditional expression (2) is exceeded, the curvature radius r1 of the −Z-side surface of the first lens element 21 is too small as compared with the focal length fl of the visual optical system 12. Therefore, the positive power of first lens element 21 is excessively strong, and it may be difficult to widen the angle of the visual optical system 12. On the other hand, when the lower limit of the conditional expression (2) is fallen below, the power of the first lens element 21 is too weak, and it may be difficult to appropriately correct various aberrations. Therefore, it may be difficult to obtain fine imaging performance in the visual optical system 12.

The effect described above with respect to the conditional expression (2) can be more remarkably obtained when the visual optical system 12 satisfies the following conditional expression (2a).

$$0.01 < fl/r1 < 0.16 \tag{2a}$$

2-3-1. Example 1

A numerical example of the visual optical system 12 of Example 1 that satisfies the conditional expressions (1) and (2) will be described with reference to FIGS. 6 to 10.

FIG. 6 shows surface data on the visual optical system 12 in Numerical Example 1. The surface data in FIG. 6 indicates information on various surfaces of the visual optical system 12 through which the display light beams B1 to B10 pass in the order from the emission destination on the −Z side of the pupil A to the display surface S of the emission source. For example, the second and third surfaces are respectively a −Z side surface and a +Z side surface of the first lens element 21, and the fourth and fifth surfaces are respectively a −Z side surface and a +Z side surface of the second lens element 22. The sixth surface indicates the same surface as the fourth surface based on the reflection of the display light beam (the same applies to the seventh to ninth surfaces).

In the surface data in FIG. 6, the information on each surface includes, for example, the curvature radius r of the vertex and the surface interval d (e.g., in units of mm), and the refractive index nd and the Abbe number vd of each element with respect to the d line. The surface interval d has a sign corresponding to the ±Z side. In FIG. 6, the surface numbers of the aspherical surfaces are denoted by "*".

FIG. 7 shows aspherical data on the visual optical system 12 in Numerical Example 1. The aspherical data on FIG. 7 indicates various coefficients of the following formula (10) for defining the shape of the rotationally symmetric aspherical surface for each aspherical surface in FIG. 6.

[Mathematical 1]

$$z = \frac{h^2/r}{1 + \sqrt{1 - (1 + \kappa)(h/r)^2}} + \sum A_n h^n \tag{10}$$

In the above formula (10), h is a height from the optical axis, z is a sag amount at the height h, K is a conic constant, r is a curvature radius of the vertex, and An is an nth-order aspheric coefficient. In the second term on the right side of the above formula (10), for example, n is an even number of 4 or more and 10 or less, and the sum for each n is taken. According to the above formula (10), the sag amount z corresponding to the distance between the point at the height h on the target surface and the tangential plane of the vertex is defined so as to have a deviation from the spherical shape according to the aspheric coefficient An.

FIG. 8 shows various data on the visual optical system 12 in Numerical Example 1. The various data in FIG. 8 indicate the focal length fl, the pupil diameter, the half angle of view, the image height, the optical overall length, and the back focus BF of the visual optical system 12 of the present numerical example. The pupil diameter is a diameter of the pupil A. The half angle of view corresponds to ½ of the viewing angle (see α in FIG. 5). The back focus BF is, for example, a length in air. The unit of the various lengths is "mm", and the unit of the half angle of view is "°".

Figure 9:
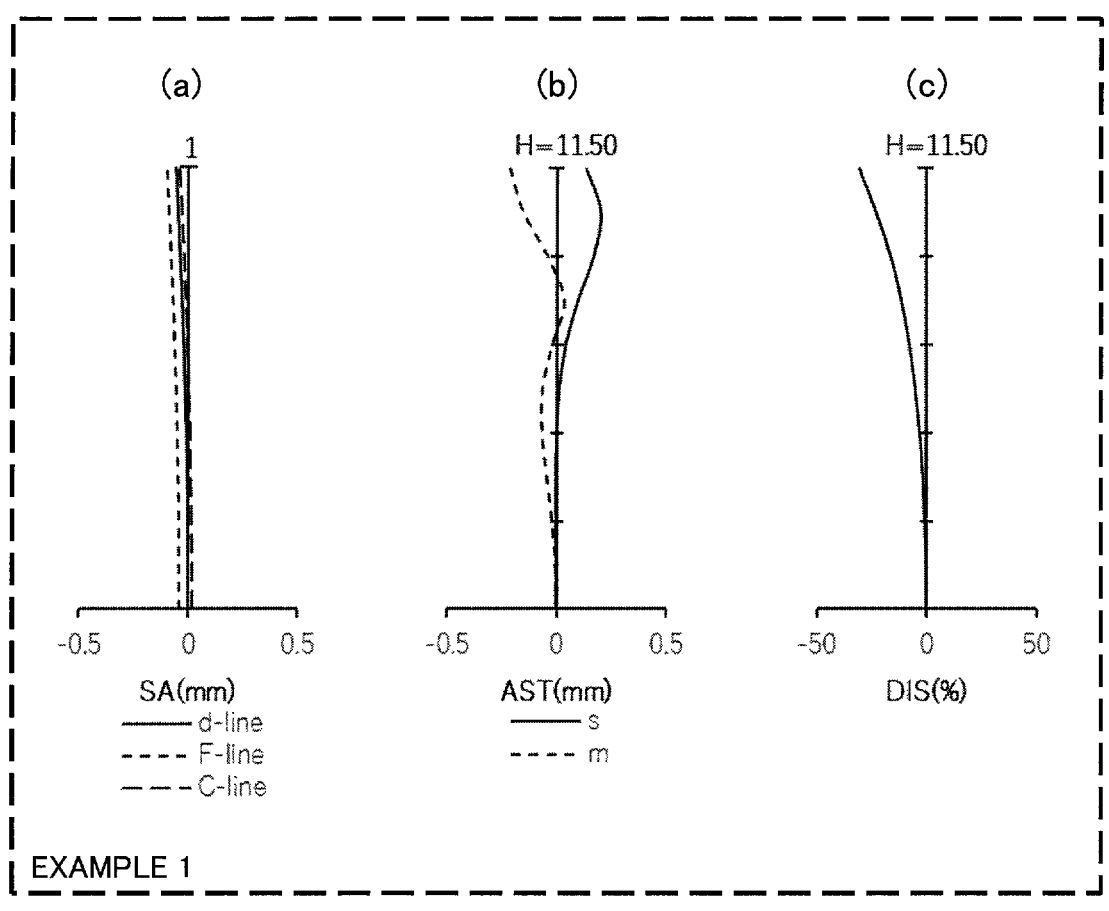
FIG. 9 is an aberration diagram showing various aberrations of the visual optical system in Numerical Example 1.

FIG. 9 is an aberration diagram showing various aberrations of the visual optical system 12 in the present numerical example. Each of the following aberration diagrams exemplifies various longitudinal aberrations in a zero diopter state. FIGS. 9(a), 9(b), and 9(c) respectively show a spherical aberration diagram, an astigmatism diagram, and a distortion aberration diagram of the visual optical system 12 according to the present numerical example.

The horizontal axis in FIG. 9(a) indicates the spherical aberration "SA" in units of mm, and the vertical axis normalizes the pupil height. In the spherical aberration diagram, a solid line of "d-line" indicates the characteristic of the d-line, a broken line of "F-line" indicates the characteristic of the F-line, and a broken line of "C-line" indicates the characteristic of the C-line. The horizontal axis in FIG. 9(b) indicates the astigmatism "AST" in units of mm, and the vertical axis indicates the image height. In the astigmatism diagram, a solid line of "s" indicates the characteristic of the sagittal plane, and a broken line of "m" indicates the characteristic of the meridional plane. The horizontal axis in FIG. 9(c) indicates the distortion aberration "DIS" in units of %, and the vertical axis indicates the image height.

FIG. 10 shows satisfiability of various conditions in the visual optical system 12 according to the present embodiment. In FIG. 10, for each example of the visual optical system 12, calculation values of the respective middle sides in the conditional expressions (1) and (2) are shown together with the viewing angle and the eye relief ER. As shown in FIG. 10, the visual optical system 12 of Example 1 satisfies the conditions (1) and (2) described above.

The visual optical system 12 according to the present embodiment can be implemented in various forms without being limited to Example 1 described above. Hereinafter, Examples 2 to 4 of the visual optical system 12 will be described.

2-3-2. Example 2

In Example 2, an example in which the arrangement of the ¼ wave plate 42 is different from that of the visual optical system 12 of Example 1 will be described with reference to FIGS. 11 to 15.

Figure 11:
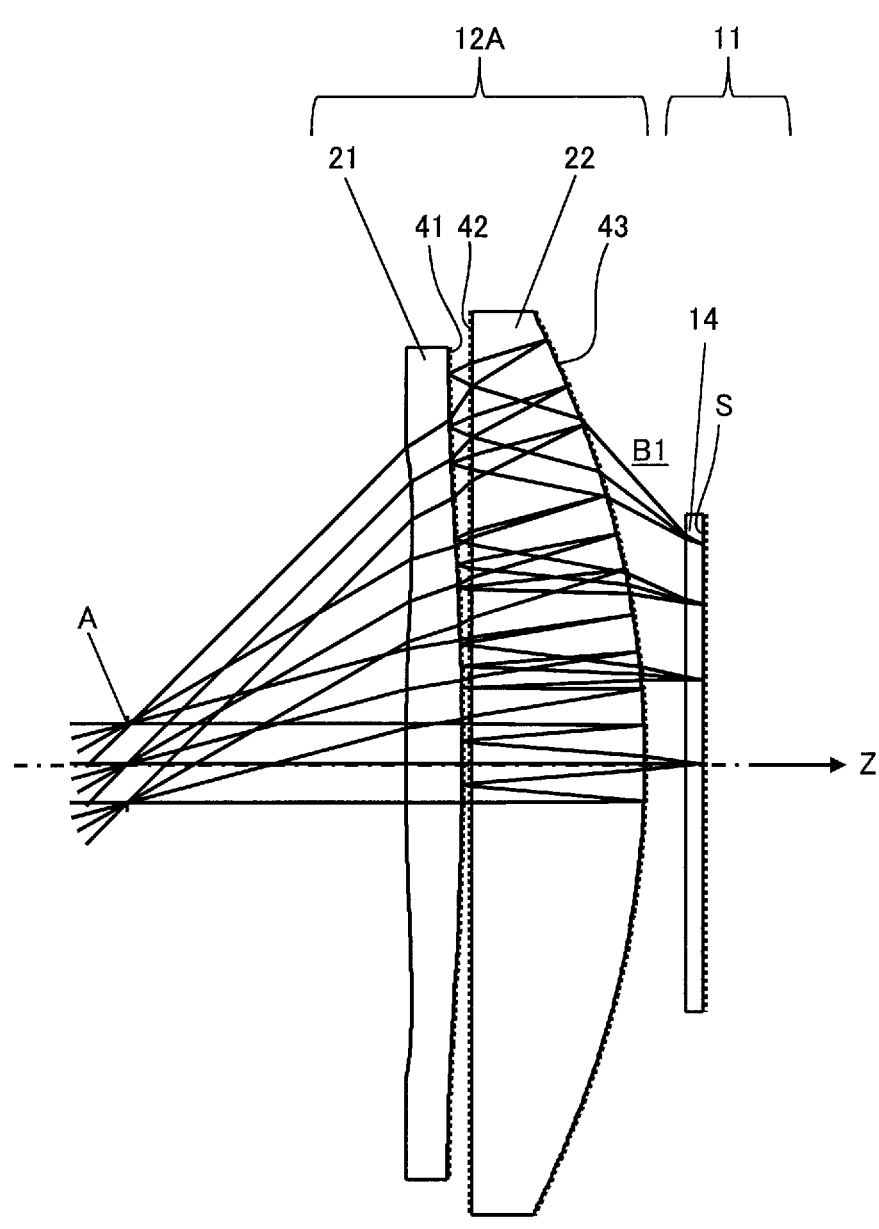
FIG. 11 is a lens arrangement diagram showing a configuration of a visual optical system according to Example 2.

FIG. 11 shows a configuration of a visual optical system 12A according to Example 2 similarly to FIG. 3 of Example 1. In the visual optical system 12A of the present example, the ¼ wave plate 42 is provided on the −Z side surface of the second lens element 22 as shown in FIG. 11, instead of being provided on the +Z side surface of the first lens element 21 in Example 1 (FIG. 3). Also in this case, the range in which the optical path of the display light beam is folded back is limited between the +Z side surface of the first lens element 21 and the +Z side surface of the second lens element 22 as in Example 1.

In addition, in Example 1, the +Z-side surface of the first lens element 21 is a flat surface (see FIG. 3), but in the present example, the −Z-side surface of the second lens element 22 is a flat surface. In the present example, the +Z-side surface of the first lens element 21 is a rotationally symmetric aspherical surface, for example. The +Z side surface of the first lens element 21 is, for example, convex toward the +Z side as shown in FIG. 11. Accordingly, the first lens element 21 can be facilitated to function as a positive lens. It should be noted that in the present example, the polarizing reflective surface 41 is provided on the +Z side surface of the first lens element 21 by film bonding, for example.

A numerical example corresponding to the visual optical system 12A of Example 2 is shown in FIGS. 12 to 14. FIG. 12 shows surface data on the visual optical system 12A in Numerical Example 2 as with FIG. 6. FIG. 13 shows aspherical data in the present example as with FIG. 7. FIG. 14 shows various data in the present example as with FIG. 8.

Figure 15:
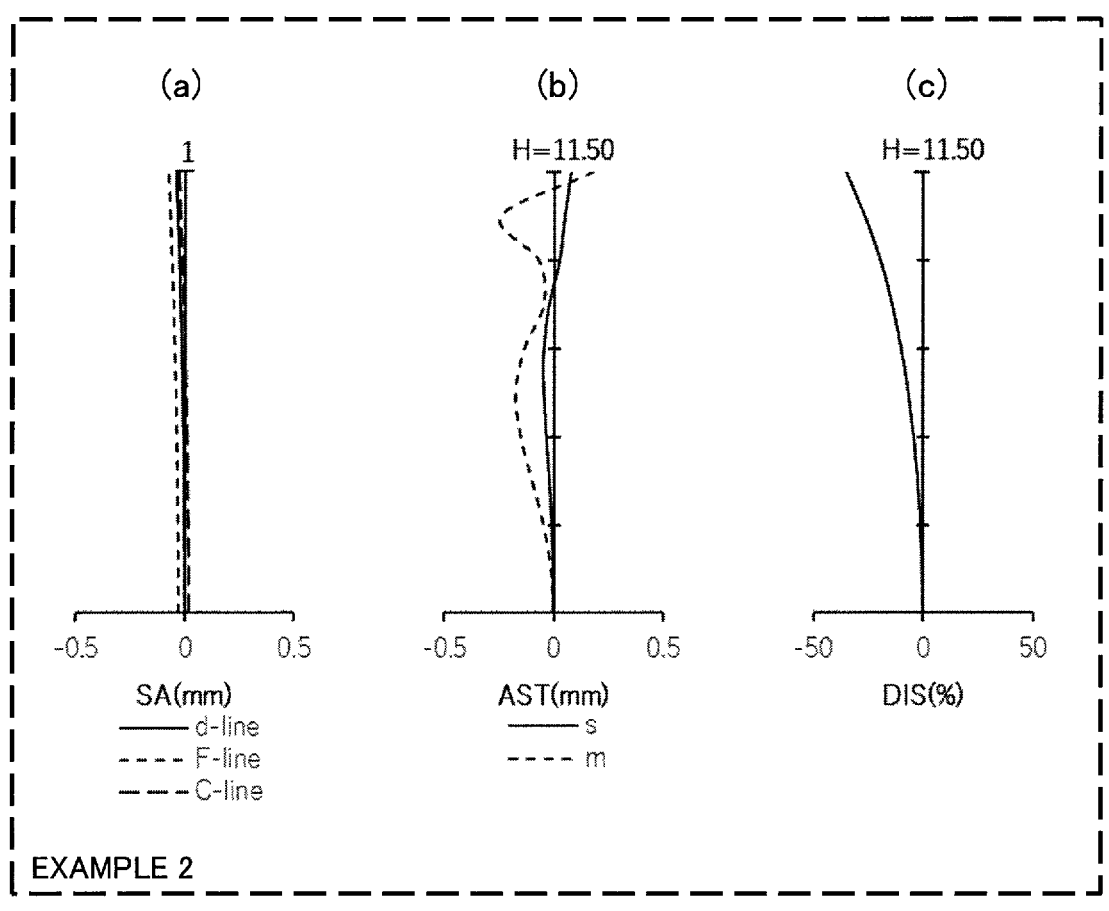
FIG. 15 is an aberration diagram showing various aberrations of the visual optical system in Numerical Example 2.

FIG. 15 shows various aberrations of the visual optical system 12A in Numerical Example 2. FIGS. 15(a), 15(b), and 15(c) show respective aberration diagrams of the visual optical system 12A in the present example as with FIGS. 9(a), 9(b), and 9(c). As shown in FIG. 10, the visual optical system 12A of the present example satisfies the conditions (1) and (2). The same effects as those of Example 1 can be obtained also by the visual optical system 12A of the present example. For example, for the user 5 of the display device 1, a visual field in which the virtual image V is visually recognized well, such as a wide viewing angle, can be easily secured.

2-3-3. Example 3

A visual optical system 12B of Example 3 will be described with reference to FIGS. 16 to 20.

Figure 16:
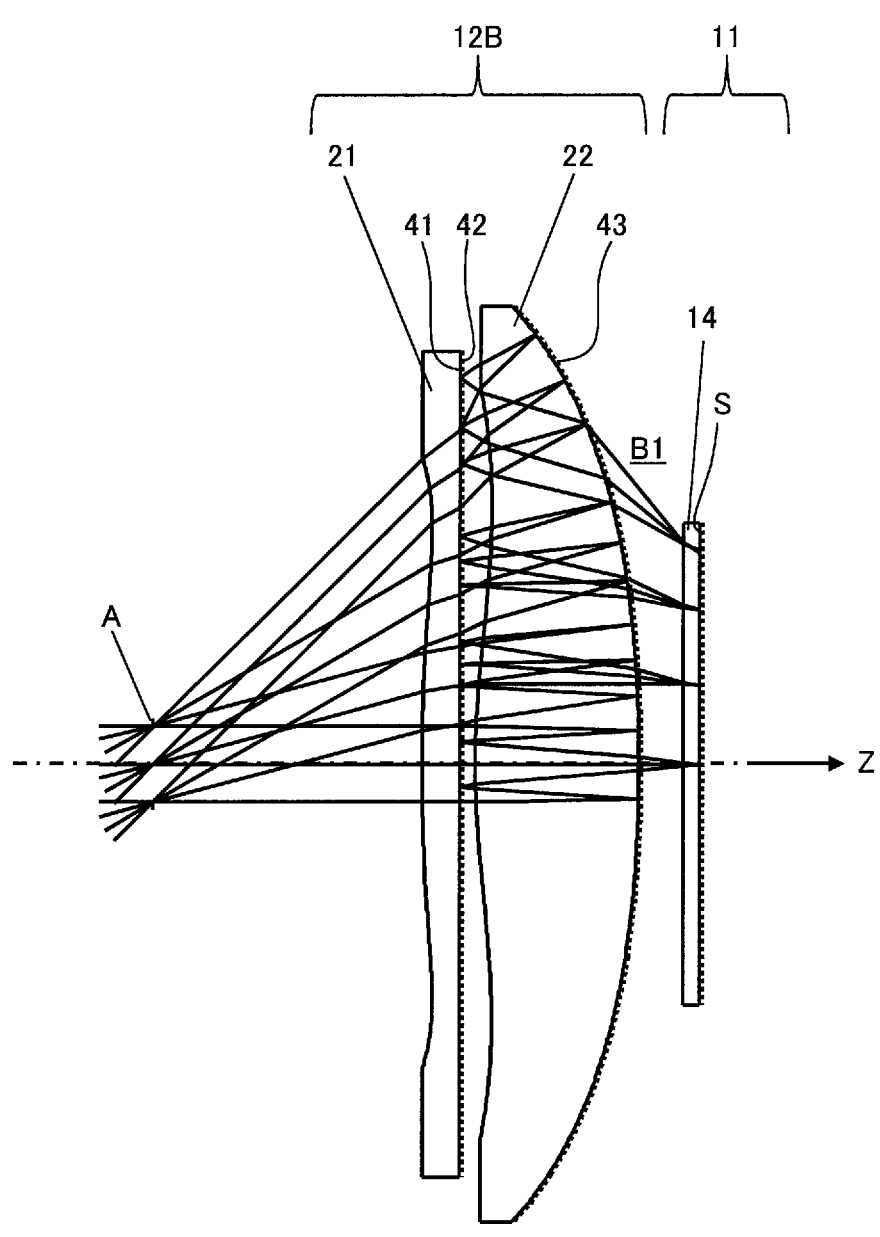
FIG. 16 is a lens arrangement diagram showing a configuration of a visual optical system according to Example 3.

FIG. 16 shows a configuration of a visual optical system 12B according to Example 3 similarly to FIG. 3 of Example 1. In the visual optical system 12B of the present example, parameters such as shapes of various aspherical surfaces are changed in a configuration as in the visual optical system 12 of Example 1. For example, in the present example, the −Z side surface of the first lens element 21 has a sag amount SagH larger than that in Example 1 at the maximum image height of the display surface S (see expression (1)).

A numerical example corresponding to the visual optical system 12B of Example 3 is shown in FIGS. 17 to 19. FIG. 17 shows surface data on the visual optical system 12B in Numerical Example 3 as with FIG. 6. FIG. 18 shows aspherical data in the present example as with FIG. 7. FIG. 19 shows various data in the present example as with FIG. 8.

Figure 20:
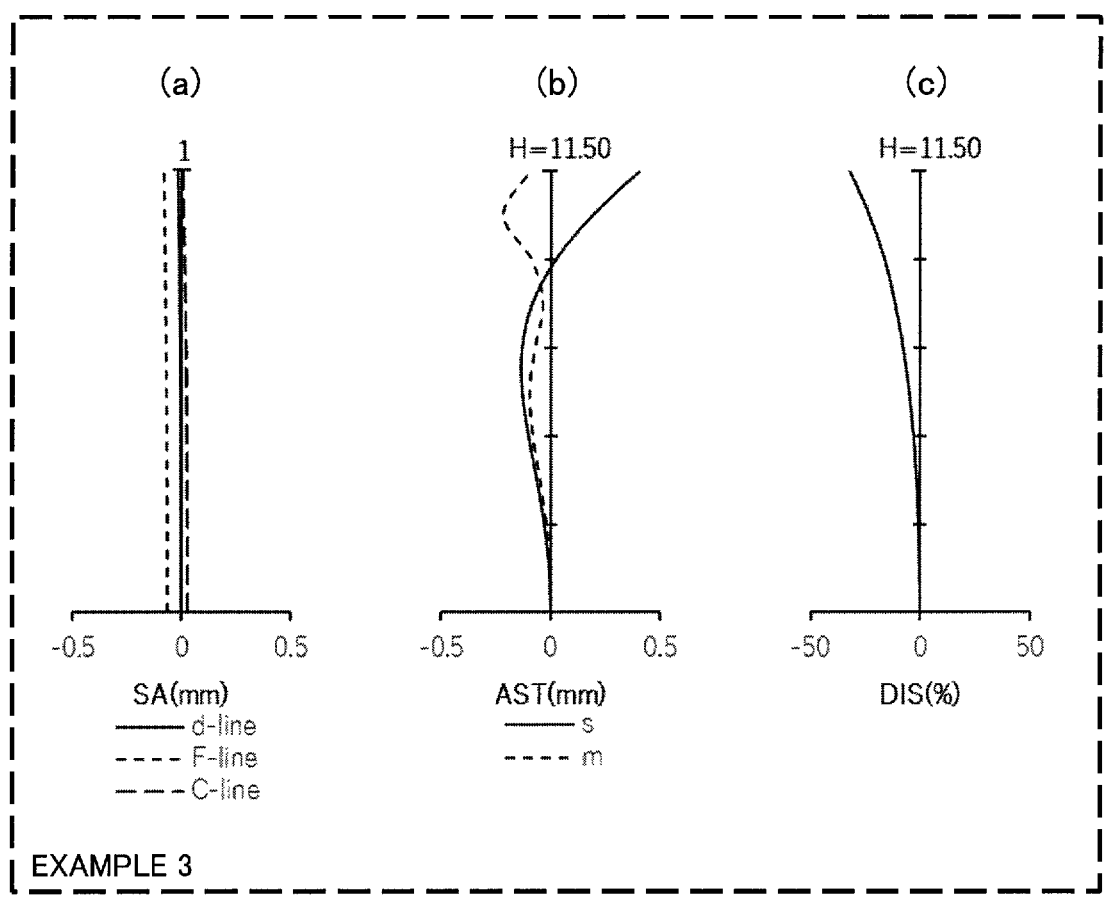
FIG. 20 is an aberration diagram showing various aberrations of the visual optical system in Numerical Example 3.

FIG. 20 shows various aberrations of the visual optical system 12B in Numerical Example 3. FIGS. 20(a), 20(b), and 20(c) show respective aberration diagrams of the visual optical system 12B in the present example as with FIGS. 9(a), 9(b), and 9(c). As shown in FIG. 10, the visual optical system 12B of the present example satisfies the conditions (1) and (2), and also with this, the same effects as those of Example 1 can be obtained.

2-3-4. Example 4

A visual optical system 12C of Example 4 will be described with reference to FIGS. 21 to 25.

Figure 21:
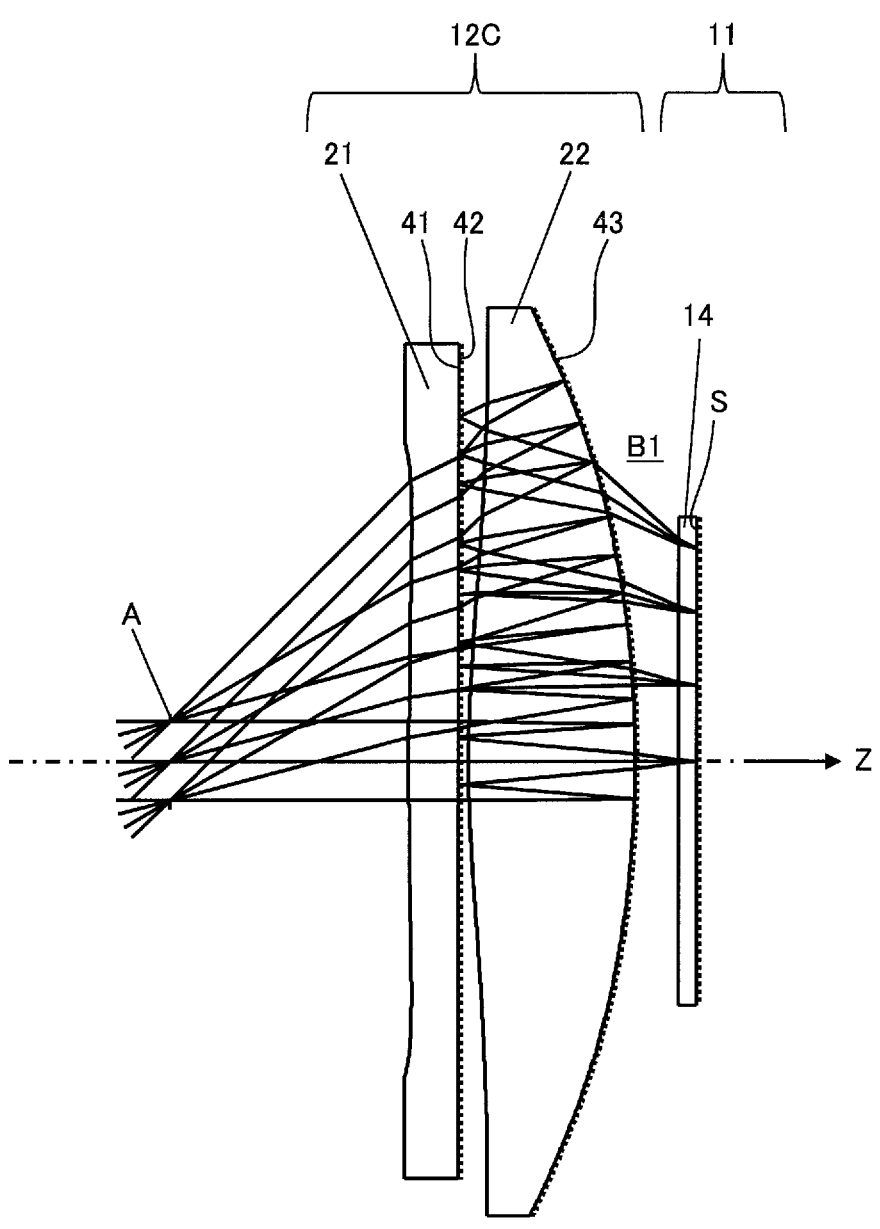
FIG. 21 is a lens arrangement diagram showing a configuration of a visual optical system according to Example 4.

FIG. 21 shows a configuration of a visual optical system 12C according to Example 4 similarly to FIG. 3 of Example 1. The visual optical system 12C of the present example is configured so that the eye relief ER is relatively short in a configuration as in Examples 1 and 3 (see FIG. 10).

A numerical example corresponding to the visual optical system 12C of Example 4 is shown in FIGS. 22 to 24. FIG. 22 shows surface data on the visual optical system 12C in Numerical Example 4 as with FIG. 6. FIG. 23 shows aspherical data in the present example as with FIG. 7. FIG. 24 shows various data in the present example as with FIG. 8.

Figure 25:
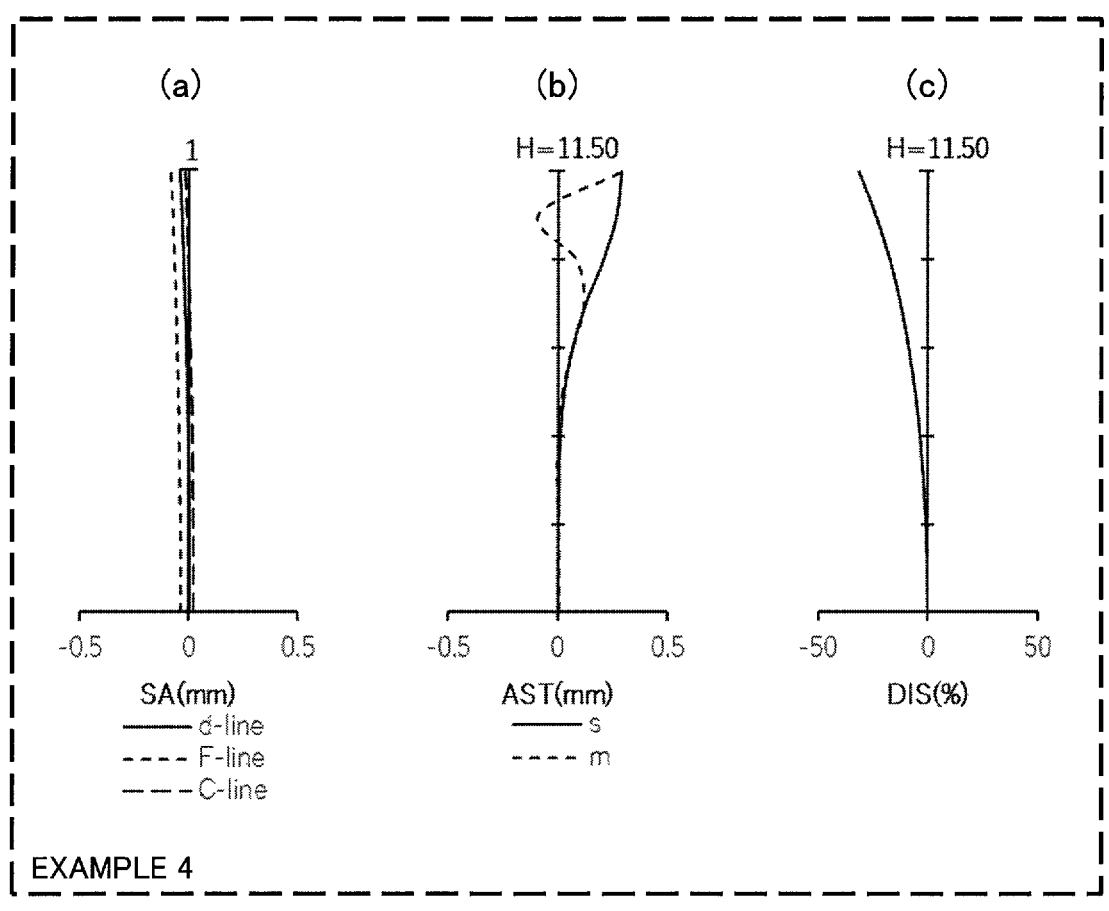
FIG. 25 is an aberration diagram showing various aberrations of the visual optical system in Numerical Example 4.

FIG. 25 shows various aberrations of the visual optical system 12C in Numerical Example 4. FIGS. 25(a), 25(b), and 25(c) show respective aberration diagrams of the visual optical system 12C in the present example as with FIGS. 9(a), 9(b), and 9(c). As shown in FIG. 10, the visual optical system 12C of the present example satisfies the conditions (1) and (2), and also with this, the same effects as those of Example 1 can be obtained.

3. Summary

As described above, the visual optical system 12 in the present embodiment is an example of an eyepiece optical system having an optical axis along the Z direction that guides a light beam between the pupil A of the user 5 and the display surface S. The visual optical system 12 includes a first lens element 21 and a second lens element 22. The first lens element 21 has, on the display side (+Z side) toward the display surface S, a polarizing reflective surface that reflects or transmits the light beam according to the polarization of the light beam incident by the polarizing reflector 41. The second lens element 22 is disposed between the first lens element 21 and the display surface S, and has a partial reflection surface for reflecting a part of the light beam incident by the half mirror 43 and for transmitting a remaining part of the incident light beam. The first lens element 21 has an aspherical surface including a convex region Ra which has a convex shape toward a side opposite to the polarizing reflective surface on the pupil side (−Z side) facing the pupil, and in which the optical axis is positioned. The aspherical surface on the pupil side in the first lens element 21 satisfies the following condition (1):

$$0.05 < SagH/BF < 0.25 \tag{1}$$

where
SagH: sag amount at the maximum image height H of the display surface S, and
BF: back focus of the eyepiece optical system.

According to the visual optical system 12 described above, due to the −Z side surface of the first lens element 21 satisfying the condition (1), for example, it is possible to configure the polarizing reflection optical system to be thin and have a wide viewing angle while ensuring the back focus BF, and the visual field of the user 5 can be easily obtained. For example, it is possible to ensure the visual field of the user 5 in which the virtual image V or the like in the display device 1 can be easily viewed at a wide viewing angle.

In the present embodiment, the visual optical system 12 satisfies the following condition (2):

$$0.01 < fl/r1 < 0.20 \tag{2}$$

where
fl: focal length of the visual optical system 12, and
r1: curvature radius of the surface on the pupil side of the first lens element 21. Due to the condition (2), by appropriately controlling the power of the first lens element 21 in the visual optical system 12, the visual field of the user 5 can be facilitated to secure well.

In the present embodiment, the first lens element 21 and the second lens element 22 constitute one lens group. The eyepiece optical system of the present embodiment may include a diopter adjustment mechanism 13 that is an example of a movable mechanism in addition to the visual optical system 12. The movable mechanism moves the lens group along the optical axis within the range of the back focus BF. The movable mechanism is configured to adjust the diopter of the user 5 by moving the lens group as the diopter adjustment mechanism 13, for example. According to the visual optical system 12 of the present embodiment, the diopter can be adjusted with a simple movable mechanism.

In the present embodiment, the aspherical surface on the pupil side in the first lens element 21 may include a position having a sag amount smaller than the sag amount SagH in a range farther from the optical axis than the maximum image height H. Accordingly, by bringing the peripheral portion far from the optical axis on the −Z side surface of the first lens element 21 close to the eye 50 of the user 5, a wide viewing angle can easily be obtained.

In the present embodiment, the aspherical surface on the pupil side in the first lens element 21 may include a curved region Rb that is curved toward the pupil side as the distance from the optical axis increases around the convex region Ra. The curved region Rb may be provided at a position where a light ray of the display light beam B10a reaching the pupil A from the maximum image height H of the display surface S through the visual optical system 12 passes through the aspherical surface on the pupil side in the first lens element 21. Also with this curved region Rb, by bringing the peripheral portion on the −Z side surface of the first lens element 21 close to the eye 50 of the user 5, a wide viewing angle can be easily obtained.

In the present embodiment, the surface on the pupil side in the first lens element 21 has at least one inflection point p2, for example, at a position away from the optical axis. According to the inflection point p2, on the −Z side surface of the first lens element 21, by changing the tendency of the sag amount to change on the way from the convex region Ra near the optical axis toward the peripheral portion (e.g., the sign of the gradient of the sag amount), the light ray direction of the display light beam B10 can be appropriately controlled, and the visual field of the user 5 can be easily ensured well.

In the present embodiment, the first lens element 21 and the second lens element 22 each have, for example, positive power. A wide viewing angle can be easily secured by the positive power of the respective lens elements 21 and 22.

In the present embodiment, the partial reflection surface by the half mirror 43 is provided, for example, on the display side surface of the second lens element 22. Accordingly, the range in which the optical path is folded back in the polarizing reflection optical system reaches the +Z side surface of the second lens element 22, and the optical path lengths of the display light beams B2 to B6 can be facilitated to be long.

In the present embodiment, the visual optical system 12 further includes, for example, a ¼ wave plate 42 which is an example of a ¼ wavelength phase element. The ¼ wave plate 42 is provided on a display side surface of the first lens element 21 or a pupil side surface of the second lens element 22. The surface on which the ¼ wave plate 42 is provided is a flat surface. Accordingly, the ¼ wave plate 42 can be easily provided in the visual optical system 12.

The display device 1 in the present embodiment includes a display element 11 having a display surface S for displaying an image and a visual optical system 12. According to the display device 1 of the present embodiment, it is possible to facilitate to ensure the visual field of the user 5 by the visual optical system 12.

Other Embodiments

As described above, the first embodiment has been described as an exemplification of the technique disclosed in the present application. However, the technique in the present disclosure is not limited thereto, and can also be applied to embodiments in which changes, substitutions, additions, omissions, and the like are made as appropriate. In addition, it is also possible to combine each component described in each of the above-described embodiments to form a new embodiment. Thus, in the following, other embodiments will be exemplified.

In the first embodiment described above, the diopter adjustment mechanism 13 has been described as an example of the movable mechanism in the eyepiece optical system. In the present embodiment, the movable mechanism of the eyepiece optical system may move the lens group of the first and second lens elements 11 and 12 in the Z direction in an application different from the diopter adjustment, and may be used for zooming or focusing, for example.

In addition, in each of the above embodiments, an example has been described in which the back focus BF of the visual optical system 12 is obtained for the movable range of the movable mechanism such as the visual field adjustment mechanism 13. In the present embodiment, the back focus BF of the visual optical system 12 is not particularly limited to the movable range of various movable mechanisms, and may be ensured for various optical design purposes.

In addition, in each of the above embodiments, an example has been described in which the display device 1 includes the visual field adjustment mechanism 13 movable in the Z direction. In the present embodiment, the display device 1 may include diopter adjustment means different from the diopter adjustment mechanism 13 that is movable in the Z direction. For example, a correction lens for diopter adjustment may be separately configured to be attachable.

In addition, in each of the above embodiments, an example has been described in which the polarizing reflective surface of the visual optical system 12 reflects p-polarized light and transmits s-polarized light, but the polarizing reflective surface is not limited thereto. In the visual optical system 12 of the present embodiment, the polarizing reflective surface may reflect s-polarized light and transmit p-polarized light, or may selectively reflect or transmit circularly polarized light, for example, as in Patent Document 1. In addition, in each of the above embodiments, an example has been described in which the polarizing reflector 41 and the ¼ wave plate 42 are used in the visual optical system 12, but the ¼ wave plate 42 may be omitted.

In addition, in each of the above embodiments, an example has been described in which a rotationally symmetric aspherical surface is used in each of the lens elements 11 and 12 of the visual optical system 12. In the present embodiment, in each of the lens elements 11 and 12, a rotationally asymmetric aspherical surface may be used, and for example, a free-form surface such as an anamorphic aspherical surface or an XY polynomial surface may be used.

In addition, in each of the above embodiments, the spectacle-type HMD is exemplified as an example of the display device 1, but the display device 1 is not limited thereto. In the present embodiment, the display device 1 is not limited to the spectacle-type but may be a goggle-type HMD or an HMD for single eye vision. In addition, in the present embodiment, the display device 1 is not limited to the HMD, and may be, for example, various viewfinders such as an electronic viewfinder. Even in such various display devices 1, it is possible to easily obtain the visual field of the user, by the visual optical system 12.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiments are for exemplifying the technique in the present disclosure, various changes, substitutions, additions, omissions, and the like can be made within the scope of the claims or the equivalent thereof.

INDUSTRIAL APPLICABILITY

The present disclosure is applicable to various display devices such as an HMD and a viewfinder.

The invention claimed is:

1. An eyepiece optical system having an optical axis for guiding a light beam between a pupil of a user and a display surface, the eyepiece optical system comprising:

a first lens element having a polarizing reflective surface on a display side, the polarizing reflective surface reflecting or transmitting an incident light beam according to polarization of the incident light beam, the display side being toward the display surface; and a second lens element disposed between the first lens element and the display surface, the second lens element having a partial reflection surface reflecting a part of the incident light beam and transmitting a remaining part of the incident light beam, wherein the first lens element has an aspherical surface including a convex region on a pupil side, the convex region having a convex shape toward a side opposite to the polarizing reflective surface with the optical axis being positioned therein, the pupil side being toward the pupil, and wherein the aspherical surface on the pupil side in the first lens element satisfies a following condition (1):

$$0.05 < SagH/BF < 0.25 \qquad (1)$$

where

SagH: a sag amount at a maximum image height of the display surface with the display side of a vertex being positive and the pupil side of the vertex being negative, the vertex being a position thorough which the optical axis passes the aspherical surface in the first lens element, and BF: a back focus of the eyepiece optical system.

2. The eyepiece optical system according to claim 1, wherein the eyepiece optical system satisfies a following condition (2):

$$0.01 < fl/r1 < 0.20 \qquad (2)$$

where fl: a focal length of the eyepiece optical system, and r1: a curvature radius of the surface on the pupil side in the first lens element.

3. The eyepiece optical system according to claim 1,
wherein the first lens element and the second lens element constitute one lens group,
the eyepiece optical system further comprising a movable mechanism configured to move the lens group along the optical axis within a range of the back focus.

4. The eyepiece optical system according to claim 3, wherein the movable mechanism is configured to move the lens group to adjust a diopter of the user.

5. The eyepiece optical system according to claim 1, wherein the aspherical surface on the pupil side in the first lens element includes a position having a sag amount smaller than the sag amount SagH in a range farther from the optical axis than the maximum image height.

6. The eyepiece optical system according to claim 1, wherein the aspherical surface on the pupil side in the first lens element includes a curved region that is curved toward the pupil side as a distance from the optical axis increases around the convex region.

7. The eyepiece optical system according to claim 6, wherein the curved region is provided at a position where a light ray, which reaches the pupil from a maximum image height of the display surface via the eyepiece optical system, passes through the aspherical surface on the pupil side in the first lens element.

8. The eyepiece optical system according to claim 1, wherein the surface on the pupil side in the first lens element has at least one inflection point at a position away from the optical axis.

9. The eyepiece optical system according to claim 1, wherein each of the first lens element and the second lens element has positive power.

10. The eyepiece optical system according to claim 1, wherein the partial reflection surface is provided on a surface on the display side in the second lens element.

11. The eyepiece optical system according to claim 1, further comprising a ¼ wavelength phase element provided on a surface on the display side in the first lens element or a surface on the pupil side in the second lens element,
wherein a surface on which the ¼ wavelength phase element is provided is a flat surface.

12. A display device comprising:
a display element having the display surface to display an image; and
the eyepiece optical system according to claim 1.

13. An eyepiece optical system having an optical axis for guiding a light beam between a pupil of a user and a display surface, the eyepiece optical system comprising:
a first lens element having a polarizing reflective surface on a display side, the polarizing reflective surface reflecting or transmitting an incident light beam according to polarization of the incident light beam, the display side being toward the display surface; and
a second lens element disposed between the first lens element and the display surface, the second lens element having a partial reflection surface reflecting a part of the incident light beam and transmitting a remaining part of the incident light beam,
wherein the first lens element has an aspherical surface including a convex region on a pupil side, the convex region having a convex shape toward a side opposite to the polarizing reflective surface with the optical axis being positioned therein, the pupil side being toward the pupil, and
wherein the aspherical surface on the pupil side in the first lens element satisfies a following condition (1):

$$0.05 < SagH/BF < 0.25 \qquad (1)$$

where

SagH: a sag amount at a maximum image height of the display surface, and

BF: a back focus of the eyepiece optical system, wherein the eyepiece optical system satisfies a following condition (2):

$$0.01 < fl/r1 < 0.20 \qquad (2)$$

where fl: a focal length of the eyepiece optical system, and r1: a curvature radius of the surface on the pupil side in the first lens element.

14. A display device comprising:
a display element having the display surface to display an image; and
the eyepiece optical system according to claim 13.

* * * * *